United States Patent [19]

McKee

[11] 4,206,934
[45] Jun. 10, 1980

[54] CONTROL VALVE MECHANISM FOR AN AIR SPRING VEHICLE SUSPENSION

[75] Inventor: Laird W. McKee, La Jolla, Calif.

[73] Assignee: Grumman Flexible Corporation, Delaware, Ohio

[21] Appl. No.: 932,957

[22] Filed: Aug. 11, 1978

[51] Int. Cl.$^2$ .............................................. B60G 17/04
[52] U.S. Cl. .................................... 280/711; 280/714
[58] Field of Search ................... 280/714, 112 A, 6 R, 280/6 H, 6.1, 6.11, DIG. 1, 711, 713; 251/309, 310; 137/625.22

[56] References Cited

U.S. PATENT DOCUMENTS

| | | | |
|---|---|---|---|
| 2,527,341 | 10/1950 | Walter | 137/625.22 |
| 2,790,650 | 4/1957 | Boschi | 280/711 |
| 2,848,248 | 8/1958 | Hansen | 280/711 |
| 2,910,305 | 10/1959 | Marette et al. | 280/714 |
| 2,998,264 | 8/1961 | Stump | 280/711 |
| 3,145,032 | 8/1964 | Turek | 280/714 |

Primary Examiner—Robert B. Song
Attorney, Agent, or Firm—Charles C. Logan, II

[57] ABSTRACT

A vehicle suspension system with a control valve mechanism for regulating the air pressure within the vehicle's air springs that functions to increase the spring rate when the air spring is being compressed on curves and bumpy road surfaces. The vehicle suspension system would have an axle, a vehicle chassis, an air spring attached between the axle and the chassis, an air reservoir, and a control valve in an air line connecting the air spring and the air reservoir. The control valve has a housing with an air inlet port located in its top wall and an air exit port located in its bottom wall. A cylindrical plug member is mounted within the valve housing and it has a bore hole passing substantially diametrically through it so that when the position of the cylindrical plug within the housing is moved or adjusted the opposite ends of the bore hole can be aligned with both the air intake port and the air exhaust port at the same time.

9 Claims, 3 Drawing Figures

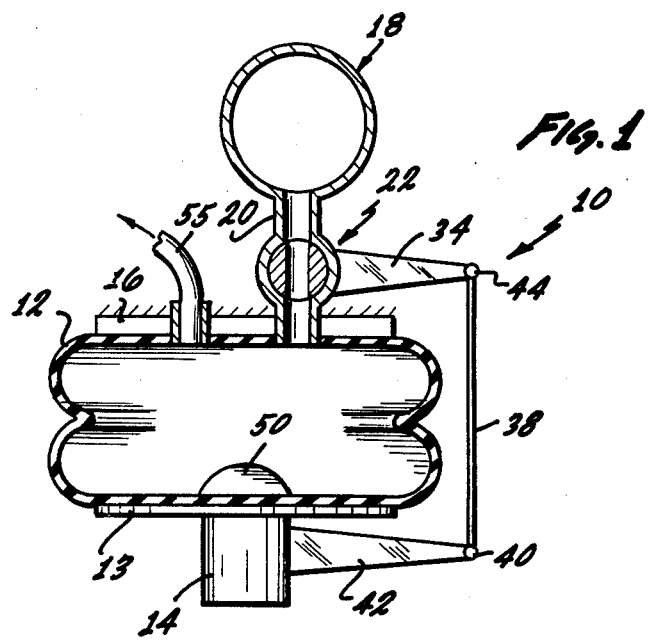
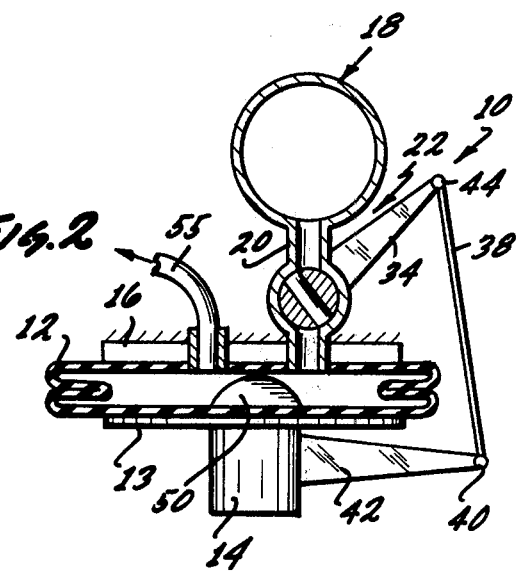
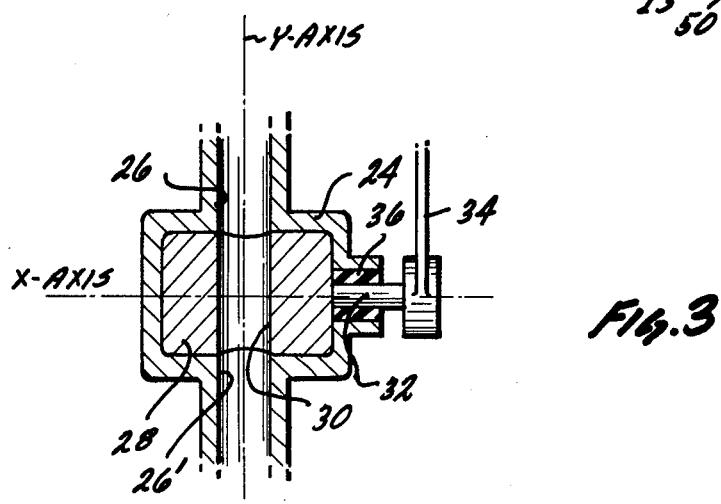

CONTROL VALVE MECHANISM FOR AN AIR SPRING VEHICLE SUSPENSION

BACKGROUND OF THE INVENTION

The invention relates generally to suspension systems for vehicles and more particularly to a novel control valve mechanism for regulating the air pressure within a vehicle air spring thereby functioning to increase the spring rate when the air spring is being compressed on curves and bumpy road surfaces.

The use of air springs to replace conventional steel springs between the sprung mass and the unsprung mass of a vehicle to support the chassis and body of the vehicle upon a running gear is now well known in the art. These air springs consist of an expansable chamber that receives air under pressure of a value suitable to support the chassis or a vehicle upon the running gear, utilizing the air of the air spring as the resilient means for supporting the body upon the running gear of the vehicle. To establish a predetermined clearance height between the sprung mass, that is, the body of the vehicle, and the unsprung mass, that is, the running gear of the vehicle, the air springs receive air under pressure from a suitable source of pressure supply on the vehicle sufficient to support the load of the body upon the running gear at a predetermined clearance height relative to the running gear.

In the past various types of control valve mechanisms have been developed for regulating the air pressure within a vehicle air spring. Some of these are illustrated in U.S. Pat. Nos. 2,910,305, 2,970,614, and 3,145,032. The control valve mechanisms in these structures are directed toward load-leveling systems that incorporate structure to provide a time delay for the responsiveness of the system or structure for selectively deactivating the control valve mechanism. Another variation is illustrated in U.S. Pat. No. 2,965,391 wherein the control valve is constructed and arranged to provide for establishing and maintaining more than one clearance type value between the sprung mass and the unsprung mass of the vehicle so as to increase the road clearance of the vehicle when desired.

It is an object of the invention to provide a novel control valve mechanism for a vehicle air suspension system that will function to increase the spring rate of the air spring when it is being compressed on curves and bumpy road surfaces.

It is also an object of the invention to provide a novel control valve mechanism for a vehicle air suspension system in which the valve will be fully closed at a point prior to full axle travel to provide the maximum spring rate at that time.

It is another object of the invention to provide a novel control valve mechanism for a vehicle air suspension system which will reduce the load on the cushioning stop member within the air spring thus allowing a softer stop member to be used which will reduce the shock when the spring bottoms.

It is another object of the invention to provide a novel control valve mechanism for a vehicle air suspension system that would allow a large air reservoir to be used to give a soft spring rate near the center of the axle motion, but increasingly firmer spring rates at the extreme positions of axle travel.

It is a further object of the invention to provide a novel control valve mechanism for a vehicle air suspension system that would have a minimum number of components which can be easily and economically manufactured and assembled.

SUMMARY OF THE INVENTION

The novel control valve mechanism is used for regulating the air pressure within a vehicle air spring to increase the spring rate when the air spring is being compressed on curves and bumpy road surfaces. The environment within which the control valve mechanism is used would be on a vehicle having an air spring attached between its axle and its chassis. The vehicle suspension system would have an air reservoir and the control valve would be positioned in an air line connecting the air spring and the air reservoir.

The control valve has a housing with an air inlet port at its top and an air exit port at its bottom. A cylindrical plug member is rotatably mounted in the valve housing. The plug member has a bore hole passing diametrically through it and the bore hole is substantially perpendicular to the longitudinal axis of the cylindrical plug member. Thus when the position for orientation of the plug within the valve housing is moved or adjusted, the opposite ends of the bore hole can be aligned with both the air intake port and air exhaust port at the same time.

A shaft is attached to the cylindrical plug member and a lever arm is in turn attached to the shaft. Thus when the lever arm is rotated the plug member will also be rotated through various stages of opening and closing of the air intake and air exhaust ports. The increase in the restriction of the air flow into or out of the air reservoir operate to increase the spring rate of the air spring. A linkage member is connected between a lever arm and the axle of the vehicle to translate the travel of the chassis toward and away from the axle into a rotational movement of the plug member within the valve housing. This linking member is pivotally connected about a fixed axis at its one end and a floating pivot point at its other end. The floating pivot point is located at the end of the lever arm opposite from where it is attached to the plug member shaft. The fixed axis pivot point is located on an immobile arm secured to and extending outwardly from the axis. Accordingly, as the axle moves upwardly or downwardly, it moves the lever causing the valve to increase the restriction of the air flow into or out of the reservoir thereby increasing the spring rate. At a point prior to full axle travel, the valve will be fully closed to give the maximum spring rate. This would reduce the load on the cushioning stop member within the air spring and allow a softer cushioning stop member to be used, thus reducing the shock when the air spring bottoms. By using a large air reservoir, a soft spring rate can be obtained near the center of the axle motion, but increasingly firmer rates would be obtained as the axle motion approaches its extreme positions.

DESCRIPTIONS OF THE DRAWINGS

FIG. 1 is a side cross sectional view illustrating a vehicle air suspension system incorporating the novel control valve mechanism and showing how the different components are oriented when the axle is at its center of travel position;

FIG. 2 is a side cross sectional view of the vehicle suspension system illustrated in FIG. 1 but showing the position of the components when the motion of the axle is at one of its extreme locations; and FIG. 3 is a horizontal cross sectional view of the control valve.

DESCRIPTION OF THE PREFERRED EMBODIMENT

The vehicle suspension system with its novel control valve mechanism will now be described by referring to FIGS. 1-3. The control valve mechanism is generally designated numeral 10. An air spring 12 has its bottom attached to the top of support plate 13 mounted on axle 14. The top of the air spring is attached to the vehicle chassis 16. Mounted above the chassis 16 would be the vehicle body.

An air reservoir 18 is connected to air spring 12 by an air line or tubing 20. Intermediate the ends of air line 20 is control valve 22.

Control valve 22 has a housing 24 with an air inlet port 26 and an air exit port 26'. A cylindrical plug member 28 is rotatably mounted in valve housing 24. The longitudinal axis of cylindrical plug member 28 lies on the X-axis. A bore hole 30 passes through cylindrical plug 28 and it has its axis on the Y-axis that is perpendicular to the X-axis. A shaft 32 is attached to cylindrical plug member 28 along the X-axis and a lever arm 34 is in turn attached to shaft 32. Shaft 32 is rotatably mounted in bushing 36 of the valve housing 24.

Linkage member 38 that translates the travel of the chassis toward and away from the axle into a rotational movement of the cylindrical plug member has its bottom end pivotally connected about a fixed axis located at the end of a rigid arm 42 extending outwardly from axle 14. The linkage member 38 has its top end pivotally connected about a floating pivot point 44 located at the free end of lever arm 34. The mechanical method described and illustrated can also be accomplished by alternate means (i.e., a device sensing axle height by electronic means [capacitance, inductance, electric eye, etc.] controlling an electrically operated valve).

Found within the air spring 12 is a cushioning stop member 50 located upon its bottom wall. Also air line 55 extends outwardly from the top of air spring 12 and it is connected to a leveling valve that adjusts the amount of air in the air spring in response to changes in the static load of passengers in the vehicle.

What is claimed is:

1. Vehicle suspension system with a control valve mechanism for regulating the air pressure within a control valve mechanism for regulating the air pressure within a vehicle air spring that functions to increase the spring rate when the air spring is being compressed or expanded on curves and bumpy road surfaces comprising:
   an axle,
   a vehicle chassis,
   an air spring attached between said axle and said chassis,
   an air reservoir, means for providing said air spring with variable spring rates in immediate response to forces causing changes in the displacement between said vehicle chasses and said axle,
   said means for providing said air spring with variable spring rates comprising a control valve having a housing with an air intake port and an air exhaust port, a first air line open only at its opposite end with these opposite ends connected respectively to said air reservoir and said air inlet port to form a completely closed air passage, a second air line open only at its opposite ends with these opposite ends connected respectively to said air exit port and said air spring to form a completely closed air passage, a plug member mounted in said valve housing, a bore hole passing through said plug member and being located in said plug member so that when the position or orientation of said plug member within said housing is moved or adjusted the opposite ends of said bore can be aligned with both said air intake port and said air exhaust port at the same time,
   means for moving or adjusting said plug member within said housing to vary the amount that said air intake and air exhaust ports are blocked off by said plug member from a position of being fully closed off to a position of full alignment in immediate response to changes in the load of the vehicle chassis load of the vehicle chassis upon the air spring,
   when said control valve ports have their maximum opening said air spring has its softest or minimum spring rate, any forces causing the vehicle chassis to move toward said axle cause the valve opening ports to grow smaller than the maximum open position and continued increasing force makes the spring rate harder and harder until the maximum spring rate is reached at the point when the valve ports are completely closed, also any forces causing the vehicle chassis to move away from said axle cause the valve opening ports to grow smaller than the maximum open position and continued increasing force makes the spring rate harder and harder until the maximum spring rate is reached at the point when the valve ports are completely closed.

2. A vehicle suspension system with a control valve mechanism as recited in claim 1 wherein said plug member is rotatably mounted in said control valve housing.

3. A vehicle suspension system with a control valve mechanism as recited in claim 2 wherein said plug is formed in the shape of a cylinder.

4. A vehicle suspension system with a control valve mechanism as recited in claim 2 wherein a shaft is attached to said plug and a lever arm in turn attached to said shaft whereby when said lever arm is rotated said plug will be rotated through various stages of opening and closing of said air intake and air exhaust ports.

5. A vehicle suspension system with a control valve mechanism as recited in claim 4 further comprising linking means connected between said lever arm and said axle that translates the travel of said chassis toward and away from said axle into a rotational movement of said plug within said valve housing.

6. A vehicle suspension system with control valve mechanism as recited in claim 5 wherein said linking means comprises a link member pivotally connected about a fixed axis at its one end and a floating pivot point at its other end.

7. A vehicle suspension system with a control valve mechanism as recited in claim 6 wherein said floating pivot point is located at the end of said lever arm opposite from where it is attached to said plug shaft.

8. A vehicle suspension system with a control valve mechanism as recited in claim 7 wherein said fixed axis pivot point is located on an immobile arm secured to and extending outwardly from said axle.

9. A vehicle suspension system with a control valve mechanism as recited in claim 1 further comprising a cushing stop member located on the bottom interior of said air spring.

* * * * *